Sept. 29, 1970     J. C. MAGUIRE     3,530,964

POWER TRANSMISSION AND STEERING DEVICE

Filed Jan. 27, 1969     2 Sheets-Sheet 1

INVENTOR
John C. MAGUIRE
deceased

BY Pierre Lesperance

PATENT AGENT

United States Patent Office 3,530,964
Patented Sept. 29, 1970

3,530,964
POWER TRANSMISSION AND STEERING DEVICE
John C. Maguire, deceased, late of Lennoxville, Quebec, Canada, by Ivy Maguire, nee Cook, executrix, Cookshire Highway, Lennoxville, Quebec, Canada
Filed Jan. 27, 1969, Ser. No. 795,143
Claims priority, application Canada, Feb. 23, 1968, 013,276
Int. Cl. F16d 25/06; B62d 11/08
U.S. Cl. 192—59
8 Claims

ABSTRACT OF THE DISCLOSURE

A power transmission having a single input member and two axially aligned output shafts, each having a wobble plate affixed thereto. The output shafts are coupled to the input member by way of first and second operating push rods which are associated with first and second valve members. The valve members block fluid passages which in turn cause piston members, carried by the input member, to clutch the input member to the wobble plates.

---

The present invention relates to a power transmission and steering device particularly designed for track laying vehicles having a pair of endless tracks.

Already known power transmission and steering devices for endless track vehicles comprise clutching systems for each driven shaft of the endless tracks and the operation of these clutching systems results in friction and, consequently, in loss of power. Furthermore, these systems are cumbersome and expensive to build.

The general object of the invention resides in the provision of a power transmission and steering device for endless track vehicles of the hydrostatic type, that is using a fluid system to clutch or unclutch the driven shafts to the driving element, resulting in a minimum of power loss through friction and in a simple, compact and relatively inexpensive assembly.

Another object of the invention resides in the provision of a device of the character described, in which control thereof can be effected by a manual lever, as the control of the device does not require any excessive force.

The foregoing and other objects of the present invention will become more apparent during the following disclosure and by referring to the drawings, in which.

Figure 1:
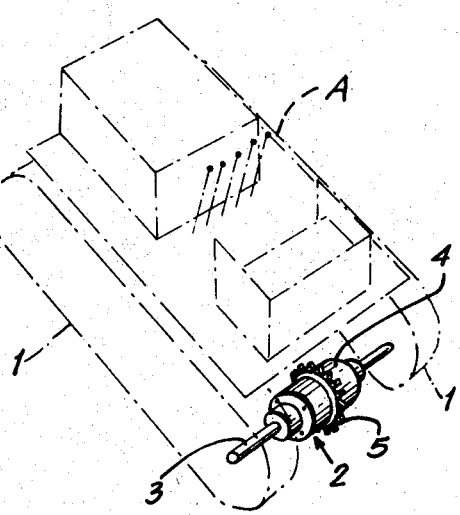
FIG. 1 is a perspective view of the power transmission and steering device in accordance with the invention associated with a track laying vehicle with two endless tracks, the mounting of the device not shown.
Figure 3:
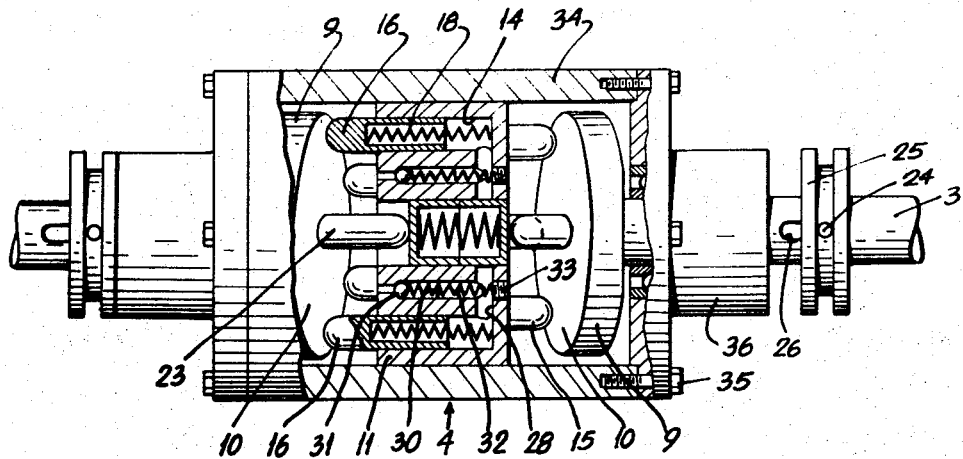
FIG. 3 is a top view of the unit, partially in longitudinal section, but with the crown gear and bearings removed.
Figure 6:
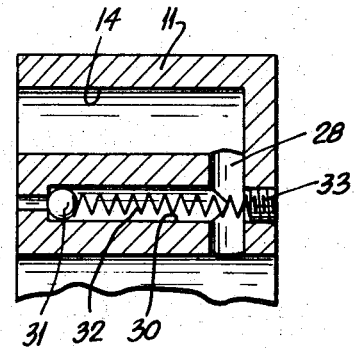
FIG. 6 is a partial longitudinal section, on an enlarged scale, of the centre block.
Figure 4:
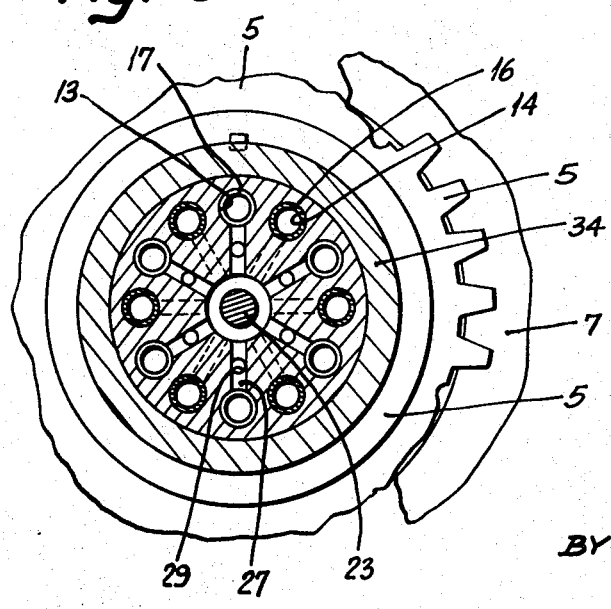
FIG. 4 is a cross-section taken along line 4—4 of FIG. 2.

Referring to the drawings in which like reference characters indicate like elements throughout, FIG. 1 shows as an example a tractor A having two endless tracks 1, which are driven by means of the unit generally shown at 2 having two output shafts 3 connected to sprocket wheels meshing with the endless tracks.

Figure 2:
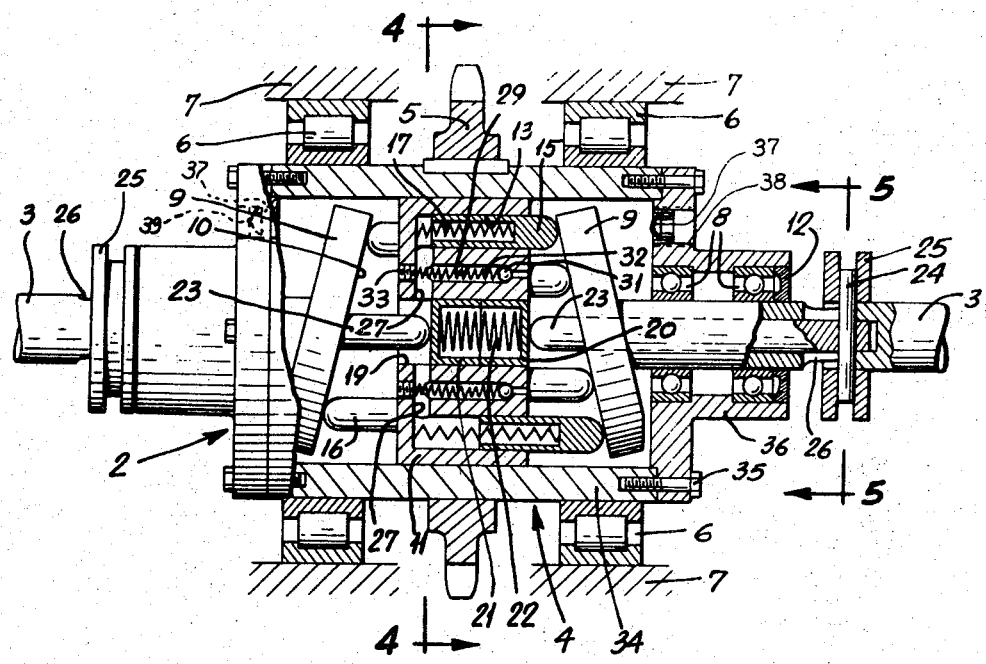
FIG. 2 is a longitudinal section, partially in elevation, of the unit of the invention.

The unit 2 comprises a cylindrical casing 4 around the center of which is keyed a crown gear 5, as shown in FIG. 2, said crown gear driven by the engine of the tractor A, for instance by a sprocket chain, not shown.

The casing 4 is mounted for rotation in bearings 6 supported by the framework of the tractor shown at 7.

The two output shafts 3 issue laterally from the cylindrical casing 4 and are axially aligned and their proximate ends enter the casing. The casing 4 is rotatably mounted on shafts 3 by means of thrust bearings 8. The casing has end seals 12.

The inner or proximate ends of the two output shafts 3 each rigidly carry a wobble plate 9 located within the casing 4, each wobble plate presenting an inclined bearing surface 10.

A cylindrical block 11 is located within casing 4 centrally thereof and is rigidly secured thereto, said block 11 being disposed between the two wobble plates 9 and having end faces facing the respective wobble plates 9 and substantially equidistant.

The block 11 is provided with two series of axially directed blind cylinders 13 and 14 respectively, which are disposed along a cylindrical surface, co-axial with the axis of shaft 3, the cylinders 13 opening at one end face and the cylinders 14 opening at the opposite end face of the block 11, the cylinders 13 and 14 being alternately disposed.

Pistons 15 and 16 are slidably mounted in the cylinders 13 and 14 respectively and are pressed in contact with the associated wobble plates 9 by springs 17 and 18 respectively bearing against the closed end of the cylinders.

A through bore 19 is made axially of the block 11 and is therefore aligned with the shafts 3. Said through bore 19 receives a pair of independent slide valves 20, 21 urged apart by means of a common spring 22 interposed between the two slide valves.

These slide valves are urged by spring 22 in contact with pusher rods 23 which are each axially and slidably mounted within output shafts 3. The pusher rods extend outwardly of casing 4 and are secured by means of a cross pin 24, each to a grooved collar 25 slidably mounted on the output shaft, the cross pin 24 being capable of longitudinal displacement within elongated opening 26 made in the output shaft 3.

The center block 11 is provided with two series of fluid passages 27 and 28 respectively, each associated with one cylinder 13 and 14 respectively. These passages are radially directed and open at the peripheral surface of the through bore 19, the passages 27 being disposed near one end or side surface of the block 11, while the passage 28 are disposed near the opposite end of the bore associated with the opposite side surface of the block 11. Thus, these passages are disposed along a circle at equal angular distances and are adapted to be selectively and independently closed or open by positioning the two independent slide valves 20 and 21 respectively opposite the passages, or inwardly of the same, as shown in the drawings.

Each passage 27 and 28 is associated with a by-pass 29–30, respectively axially arranged within the block 11, these by-passes opening on the same side of the center block as the associated cylinders 13 and 14.

Each by-pass has a restricted end provided with a check ball valve 31 urged in closed position by a compression spring 32 accessible by a screw plug 33.

The casing 4 together with the cylinders 13, 14, passages 27 and 28 and by-pass 29 and 30, are adapted to be filled with liquid, preferably hydraulic fluid.

The check valve 31 allows ingress of fluid within the by-passes 29 and 30 and associated cylinder 13, 14 to keep the cylinders and the passages 27 and 28 constantly filled with hydraulic fluid. The check valve does not allow exit of the fluid into the main chamber of the casing 4.

Figure 7:
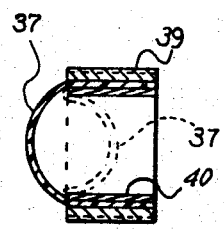
FIG. 7 is a section of the expansible diaphragm.
Figure 5:
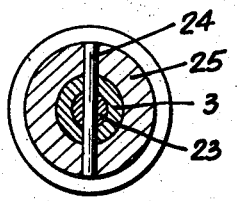
FIG. 5 is a cross-section taken along line 5—5 of FIG. 2.

The casing 4 is preferably made of a cylindrical barrel 34, to which are secured by screws 35 flanged collars 36, themselves mounted on the output shaft 3 with the interposition of bearings 8. Thus, the device can be readily dismounted if so desired. If casing 4 is completely filled with hydraulic fluid, expansible chambers means are preferably associated with said casing to allow for expansion of the fluid under heat. These means may consist of a flexible, elastic diaphragm 37, made for instance of synthetic rubber, secured in a threaded bushing 39 by a collar 40. Bushing 39 is screwed in a bore 38 made in the flange of each collar 36. Diaphragm 37 is shown in expanded and in retracted position at the left and right of FIG. 2 respectively. The device is also shown in FIG. 7.

The power transmission and steering device in accordance with the invention operates as follows.

Supposing the two pusher rods 23 are both retracted, the two slide valves 20, 21 will then close the passages 27, 28 and the hydraulic fluid within these passages and by-passes and within the cylinders 13 and 14, will lock all of the pistons 15, 16 in contact with the wobble plates 9 and, therefore, the wobble plates are clutched to the casing 4 which drives both output shafts 3.

If one or the other of the pusher rods is pushed inwardly, the associated slide valve is caused to take a passage opening position whereby the pistons mounted in the cylinders associated with the open passages, will be free to reciprocate within said cylinders while sliding on the inclined surface 10 of the wobble plate 9. Therefore, these wobble plates become declutched from casing 4 and the output shaft associated with the above wobble plate no longer rotates, allowing turning movement of the tractor 8, one endless track being idle.

If desired, by making both slide valves shorter, they both may be caused to take a passage opening position, thereby declutching both output shafts from the casing 4. This, of course, would be an obvious modification of the system if such is desired, thereby eliminating other clutching device between the engine and the casing.

The grooved collars 25 for operating the pusher rods are engageable by forked rods, not shown, connected by a common linkage to a single control arm, not shown, accessible to the driver of the tractor or other endless track vehicle.

In the example shown, the pusher rods are reciprocated simultaneously by the linkage; but, if the slide valves are made shorter so as to allow opening of both series of passages 27 and 28, then another linkage system may be arranged to provide for full declutching of both output shafts.

From the foregoing, it is seen that the device provides a power transmission and, at the same time, a steering means for an endless track vehicle and in which a minimum of power loss through friction, is produced.

What I claim is:

1. A power transmission and steering device comprising a pair of axially aligned output shafts, wobble plates rigid with the proximate ends of said shafts and spaced from each other, a motor-driven casing rotatably mounted on said shafts and housing said wobble plates, a block located in said casing between said two wobble plates and rigid with said casing, first and second series of axially directed blind cylinders made in said block and opening towards the respective wobble plates, pistons in said cylinders, spring urged in contact with the respective wobble plates, each cylinder having a passage opening into said casing, independently operated first and second valve members for closing and opening the passages of said first and second series of cylinders respectively, control means to position said valve members, accessible at the exterior of said device, said cylinders and passages adapted to be filled with a liquid, whereby closing of all the passages by both valve members axially block said pistons in their respective cylinders against said wobble plates to clutch the wobble plates of both shafts with said casing, and opening of the passages of one or the other, or of both series of said cylinders will cause declutching of the associated wobble plates.

2. A device as claimed in claim 1, wherein the cylinders of the first series alternate with the cylinders of the second series.

3. A power transmission and steering device as claimed in claim 1, wherein each passage has an intermediate by-pass opening into said casing and a check valve in each by-pass only allowing liquid ingress into the associated cylinder.

4. A power transmission and steering device as claimed in claim 3, wherein each by-pass is axially directed and opens on the same side of the block as the opening of the associated cylinder.

5. A power transmission and steering device as claimed in claim 1, wherein said block has an axial through bore, said passages of said first and second series of cylinders opening along a circular zone near both ends of said through bore, said valve members slidably mounted in said bore, spring means urging said valve members apart to normally close said passage openings, said control means including pusher rods extending through said shafts and abutting said valve members to displace the same between passage opening and closing positions.

6. A power transmission and steering device as claimed in claim 2, wherein said block has an axial through bore, said passages of said first and second series of cylinders opening along a circular zone near both ends of said through bore, said valve members slidably mounted in said bore, spring means urging said valve members apart to normally close said passage openings, said control means including pusher rods extending through said shafts and abutting said valve members to displace the same between passage opening and closing positions.

7. A power transmission and steering device as claimed in claim 3, wherein said block has an axial through bore, said passages of said first and second series of cylinders opening along a circular zone near both ends of said through bore, said valve members slidably mounted in said bore, spring means urging said valve members apart to normally close said passage openings, said control means including pusher rods extending through said shafts and abutting said valve members to displace the same between passage opening and closing positions.

8. A power transmission and steering device as claimed in claim 4, wherein said block has an axial through bore, said passages of said first and second series of cylinders opening along a circular zone near both ends of said through bore, said valve members slidably mounted in said bore, spring means urging said valve members apart to normally close said passage openings, said control means including pusher rods extending through said shafts and abutting said valve members to displace the same between passage opening and closing positions.

References Cited

UNITED STATES PATENTS

| 886,778 | 5/1908 | Dunlap | 192—59 |
| 1,357,756 | 11/1920 | Williamson | 192—59 |
| 1,363,810 | 12/1920 | Peterson | 192—59 |

FOREIGN PATENTS 880,883 10/1961 Great Britain.

ALLAN D. HERRMANN, Primary Examiner

U.S. Cl. X.R.

180—6.7; 192—48.91, 49